Figure 1:
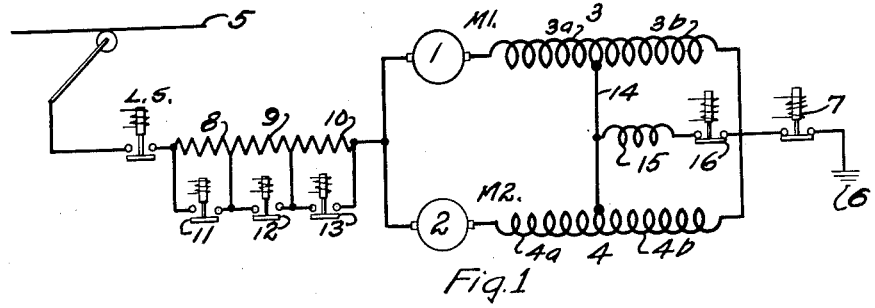

K. A. SIMMON.
CONTROL SYSTEM.
APPLICATION FILED MAR. 9, 1917.

1,296,015.

Patented Mar. 4, 1919.

WITNESSES:
William Siler
W. B. Wells.

INVENTOR
Karl. A. Simmon.
BY
Wesley J. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,296,015.      Specification of Letters Patent.      Patented Mar. 4, 1919.

Application filed March 9, 1917. Serial No. 153,540.

*To all whom it may concern:*

Be it known that I, KARL A. SIMMON, a citizen of the United States, and a resident of Edgewood Park, in the county of Allegheny and State of Pennsylvania, have invented a new and useful Improvement in Control Systems, of which the following is a specification.

My invention relates to systems of control and particularly to systems of control for electric railway vehicles.

One object of my invention is to provide a control system having means for effecting field control of the motors contained therein in an economical and an efficient manner and with a minimum number of switches.

Another object of my invention is to provide a control system of the above indicated character having means for simultaneously connecting an inductive shunt circuit to each field winding of the propelling motors for effecting field control of the same.

More specifically, my invention embodies a control system having an inductive coil that is connected to the field windings of all the motors contained therein and is connected in shunt to all the field windings by one switch.

In control systems, and particularly in electric-railway control systems, it is desirable to effect the acceleration of the propelling motors, not only by means of a number of resistance steps, but also, by field control steps. Heretofore, the field windings of the various motors in a control system have been shunted by an individual inductive coil, or a resistor, or an inductive coil and a resistor, to effect field control of the motors and thus require a separate switch associated with each field winding.

However, in a control system constructed in accordance with my invention, a single inductive coil, or a unit comprising an inductive coil and a resistor, is associated with a plurality of field windings, whereby an inductive shunt circuit is simultaneously connected around all the field windings by a single switch to effect field control of the motors.

It is inadvisable to shunt the various field windings solely by resistors in order to effect field control of the motors in that excessive flashing at the motor brushes is occasioned in such system at every make and break of the motor circuit. Whenever the motor circuit is suddenly opened and closed in such a system, the shunt circuit around the field windings does not offer sufficient impedance to the current flowing through the motor to prevent an excessive current from passing through the armature and, accordingly, an excessive flashing at the motor brushes.

Figure 2:
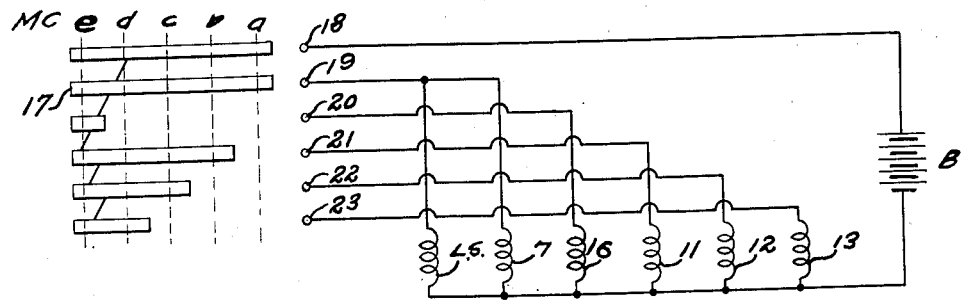

In the accompanying drawings, Figure 1 is a diagrammatic view of a control system constructed in accordance with my invention; Fig. 2 is a diagrammatic view of the auxiliary control circuits for governing the operation of the switches illustrated in Fig. 1; Figs. 3 to 10, inclusive, are diagrammatic views of modifications of my invention, and Fig. 11 is a diagrammatic view of one of the inductive coils.

Referring to Figs. 1 and 2 of the drawings, two motors M1 and M2, embodying armatures 1 and 2 and field windings 3 and 4, are adapted to be connected across a supply circuit, comprising a trolley conductor 5 and a ground-return conductor 6, by means of a line switch LS and a switch 7. A plurality of resistors 8, 9 and 10, which are initially connected in series with the motors M1 and M2, are adapted to be excluded from the motor circuit by means of switches 11, 12 and 13.

The field windings 3 and 4 are respectively composed of sections 3a and 3b and sections 4a and 4b. A bridging circuit, comprising the conductor 14, is connected to the field winding 3 intermediate the sections 3a and 3b and to the field winding 4 intermediate the sections 4a and 4b. An inductive coil 15, which has one terminal thereof connected to the conductor 14, is connected in shunt to the field-winding sections 3b and 4b by means of a switch 16.

A master controller MC, comprising a contact segment 17, is adapted to engage contact fingers 18 to 23, inclusive, when moved through positions *a* to *e*, inclusive, for completing circuits from a battery B through the coils of the various switches illustrated in Fig. 1.

When the master controller is moved through position *a*, the line switch LS and the switch 7 are energized to connect the motors M1 and M2 in parallel across the supply conductors 5 and 6. In positions *b*, *c* and *d* of the master controller, the switches 11, 12 and 13 are energized for successively excluding the resistors 8, 9 and 10 from the circuit of the motors M1 and M2. In position e of the master controller, the switch 16 is operated for connecting the inductive coil 15 in shunt to the field winding sections 3b and 4b.

Figure 3:
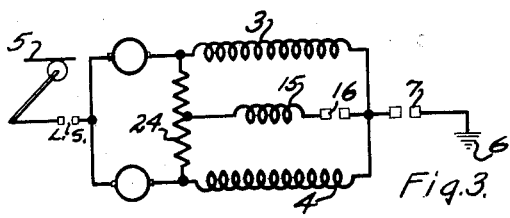

The reference characters used in Figs. 3 to 10, inclusive, correspond to those used in Fig. 1. Referring to Fig. 3 of the drawing, the field windings 3 and 4 are connected by a resistor 24 in order that the inductive shunt circuit from the field windings, which is complete when the switch 16 is operated, may contain, not only the inductive coil 15, but also a portion of the resistor 24.

Figure 4:
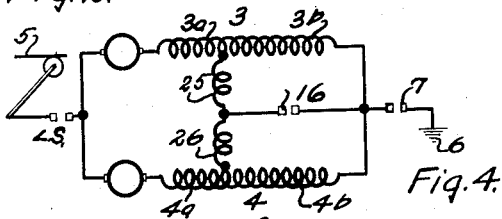

In the system disclosed in Fig. 4 of the drawing, two separate inductive coils 25 and 26 are connected in series across the field windings 3 and 4 and are connected in shunt to the field-winding sections 3b and 4b by means of the switch 16.

Figure 5:
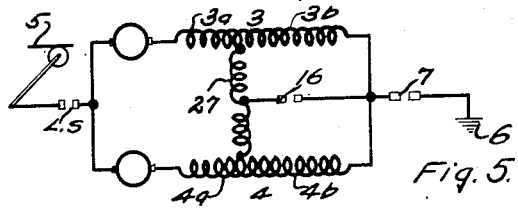

Referring to Fig. 5 of the drawing, a single inductive coil 27 is connected across the field windings 3 and 4 intermediate the sections 3a and 3b and 4a and 4b. The switch 16 is connected to the inductive coil 27 intermediate the ends thereof and is adapted to connect portions thereof in shunt to the field-winding sections 3b and 4b.

Figure 6:
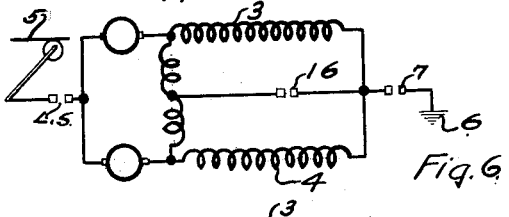

The system disclosed in Fig. 6 is similar to the system disclosed in Fig. 5, with the exception that the complete field windings 3 and 4 are shunted by portions of the inductive coil 27 when the switch 16 is operated.

Figure 7:
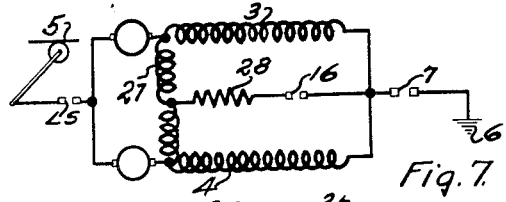

The system disclosed in Fig. 7 of the drawing is similar to the system disclosed in Fig. 6, with the exception that a resistor 28 is included in the inductive circuit around the field windings 3 and 4.

Figure 8:
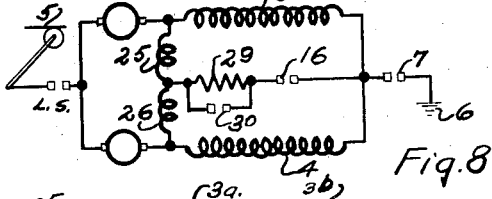

The system disclosed in Fig. 8 of the drawing is similar to the system disclosed in Fig. 4 of the drawing, with the exception that a resistor 29 is included in circuit with the inductive coils 25 and 26 whenever the switch 16 is operated. A switch 30 is provided for excluding the resistor 29 from the circuit of the coils 25 and 26.

Figure 9:
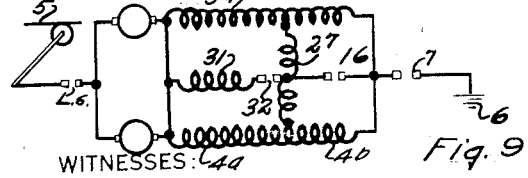

In Fig. 9 of the drawing is disclosed a system similar to the system illustrated in Fig. 5, with the exception that an additional inductive coil 31 is provided which may be connected in shunt to the field-winding sections 3a and 4a when a switch 32 is operated.

Figure 10:
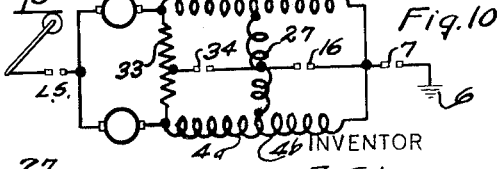
Figure 11:
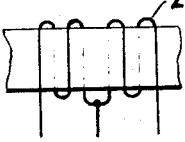

In Fig. 10 of the drawing is illustrated a system provided with an inductive coil 27 which is connected in shunt to the field-winding sections 3b and 4b when the switch 16 is operated and a resistor 33 which is connected in shunt to the field-winding sections 3a and 4a when the switch 34 is operated.

In Figs. 4, 5, 6 and 9 are disclosed systems in which inductive shunt circuits are connected to the field windings in order to effect field control of the motors, and in Figs. 3, 7, 8 and 10 resistors are included in the inductive shunt circuits, which are connected around the field windings, in order to reduce the cost of the systems and to obtain shunt circuits having a greater range of adjustment. An inductive shunt circuit provided with a resistor may be adjusted to give the motor a wide range of characteristics, as to the current consumed by the same when accelerating.

In the systems disclosed in Figs. 4 and 8, the field windings are shunted by separate inductive coils which have separate magnetic circuits. In such an arrangement, the inductance of the coil associated with one of the motors is not changed when the other motor is excluded from circuit.

In the systems disclosed in Figs. 5, 6, 7, 9 and 10, each of the field windings of the motors is shunted by a portion of a single inductive coil having one magnetic circuit, as is illustrated in Fig. 11 of the drawing. In such systems the cost and the weight of the inductive apparatus are materially reduced, since portions of the coil are mutually inductive as well as self inductive. If desired, the same magnetic circuit may serve for any number of coils, in the manner shown in Fig. 11 of the drawing.

Modifications in the system and arrangement and location of parts may be made within the spirit and scope of my invention, and such modifications are intended to be covered by the appended claims.

I claim as my invention:

1. In a system of control, the combination with two motors having armatures and field windings, of an inductive coil divided into sections, and means for shunting said field windings by different sections of said coil in order to effect field control of the motors.

2. In a system of control, the combination with a plurality of motors having armatures and field windings, of an inductive coil initially connected across said field windings and a switch for connecting said coil in shunt to said field windings in order to effect field control of the motors.

3. In a system of control, the combination with a plurality of motors having armatures and field windings, and an inductive coil initially connected across said field windings, of a switch associated with said coil and with each of said field windings for effecting field control of the motors.

4. In a system of control, the combination with a plurality of motors having armatures and field windings, and an inductive coil divided into sections and connected to said field windings, of a switch associated with said coil for severally connecting different sections of said coil in shunt to said field windings in order to effect field control of the motors.

5. In a system of control, the combination with two motors having armatures and field windings, an inductive coil connected across said field windings, and a resistor, of means for connecting said coil and the resistor in shunt to said field windings for effecting field control of the motors.

6. In a system of control, the combination with a plurality of motors having armatures and field windings, and an inductive coil initially connected across said field windings, and a resistor connected to said coil, of a switch associated with said coil, the resistor and each of said field windings for effecting field control of the motors.

7. In a system of control, the combination with two motors having armatures and field windings, an inductive coil divided into sections, and a resistor, of a switch for connecting different sections of said coil and the resistor in shunt to each of said field windings in order to effect field control of the motors.

8. In a system of control, the combination with a plurality of motors having armatures and field windings, an inductive coil divided into sections and connected to said field windings, and a resistor connected to the inductive coil, of a switch for connecting said resistor and different sections of said coil in shunt to said field windings in order to effect field control of the motors.

9. In a system of control, the combination with a plurality of motors having armatures and field windings, an inductive coil connected to said field windings, and a resistor connected to the inductive coil intermediate the ends thereof, of a switch for simultaneously connecting said resistor and a portion of said coil in shunt to each of said field windings to effect field control of the motors.

10. In a system of control, the combination with a plurality of motors having armatures and field windings, and an inductive coil initially connected across said field windings, said coil having a single core member, of a switch associated with said coil and with each of said field windings for effecting field control of the motors.

11. In a system of control, the combination with a plurality of motors having armatures and field windings, and an inductive coil connected to said field windings, said coil having a single core member, of a switch for simultaneously connecting different portions of said coil in shunt to each of said field windings in order to effect field control of the motors.

In testimony whereof I have hereunto subscribed my name this 28th day of Feb., 1917.

KARL A. SIMMON.